E. B. JACOBSON.
REGULATOR FOR ELECTRICAL CHARGING SYSTEMS.
APPLICATION FILED DEC. 3, 1913.
1,260,675.
Patented Mar. 26, 1918.
3 SHEETS—SHEET 1.
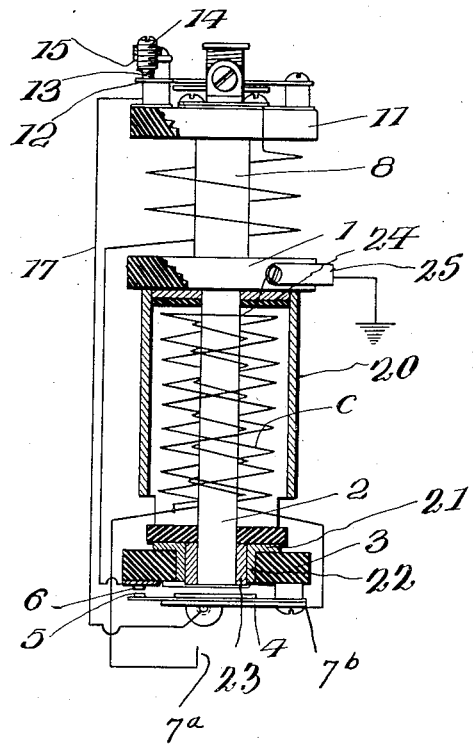
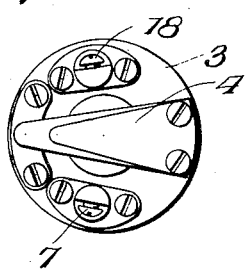
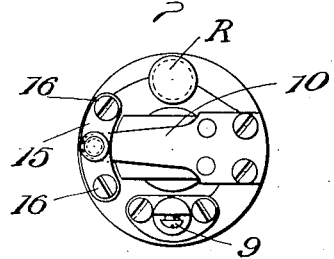
Witnesses
Inventor
Edward B. Jacobson
By
Sturtevant Mason
Attorneys E. B. JACOBSON.
REGULATOR FOR ELECTRICAL CHARGING SYSTEMS.
APPLICATION FILED DEC. 3, 1913.
1,260,675.
Patented Mar. 26, 1918.
3 SHEETS—SHEET 3.
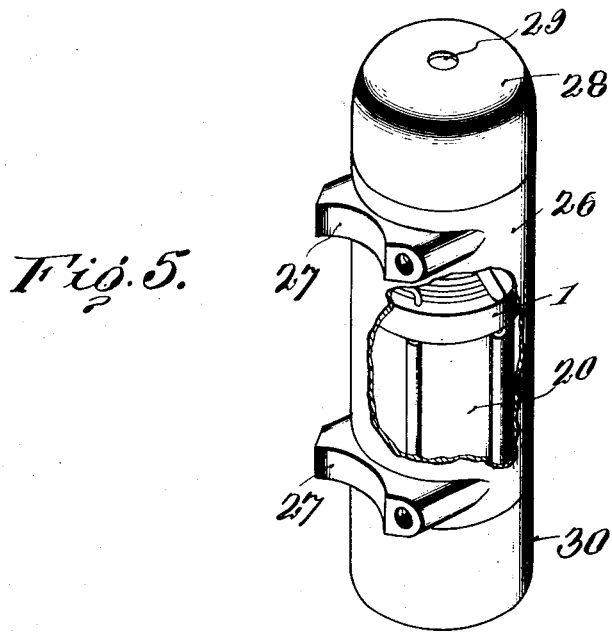
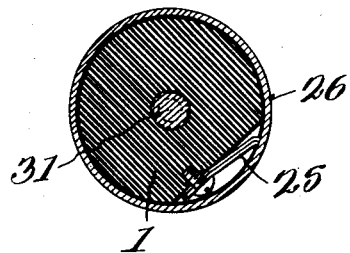
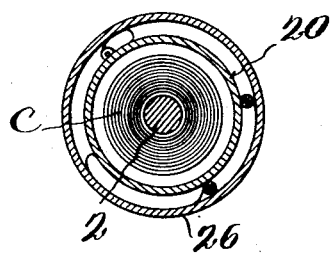
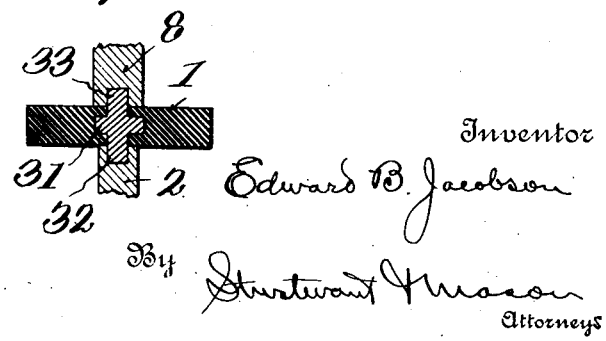
Witnesses
Inventor
Edward B. Jacobson
By Sturtevant & Mason
Attorneys

UNITED STATES PATENT OFFICE.

EDWARD B. JACOBSON, OF PITTSFIELD, MASSACHUSETTS, ASSIGNOR TO HENDEE MANUFACTURING COMPANY, OF SPRINGFIELD, MASSACHUSETTS, A CORPORATION OF MASSACHUSETTS.

REGULATOR FOR ELECTRICAL CHARGING SYSTEMS.

1,260,675. Specification of Letters Patent. Patented Mar. 26, 1918.

Application filed December 3, 1913. Serial No. 804,531.

*To all whom it may concern:*

Be it known that I, EDWARD B. JACOBSON, a citizen of the United States, residing at Pittsfield, in the county of Berkshire, State of Massachusetts, have invented certain new and useful Improvements in Regulators for Electrical Charging Systems, of which the following is a description, reference being had to the accompanying drawing and to the figures of reference marked thereon.

The invention relates to new and useful improvements in a regulator which is adapted to be used in connection with a generator and a storage battery for controlling the charge of the battery from the generator, and more particularly in connection with a generator which may be driven at widely varying speeds, as where the generator is driven by the motive power used in propelling a motorcycle.

An object of the invention is to provide a regulator which will operate to break the main circuit and hold said circuit broken until the voltage of the generator has reached a proper charging value, and which will also operate to break the circuit, provided the speed of the generator decreases to such an extent that the battery discharges through the armature of the generator.

A further object of the invention is to provide a device of the above character with a vibrator disposed in the shunt field of the generator, and controlled by the current charge in the main circuit, whereby the generator field circuit is interrupted so that the maximum value of charging current does not rise above a determinate maximum value, even though the speed of the generator is excessive or very high.

These and other objects will in part be obvious, and will in part be hereinafter more fully disclosed.

In the drawings, which show by way of illustration one embodiment of the invention, Figure 1 is a view partly in section showing a regulator embodying my improvements;

Fig. 2 is a bottom end view of the same;

Fig. 3 is a top plan view;

Fig. 5 is a perspective view showing the regulator in its supporting casing, a portion of said casing being broken away;

Fig. 6 is a transverse sectional view through the central insulating disk, showing the connection of the potential coil to the casing;

Fig. 7 is a transverse sectional view showing the inner and outer cores for controlling the contacts in the potential coil circuit;

Fig. 8 is a detail in section showing the attachment of the cores to the central insulating disk.

Figure 4:
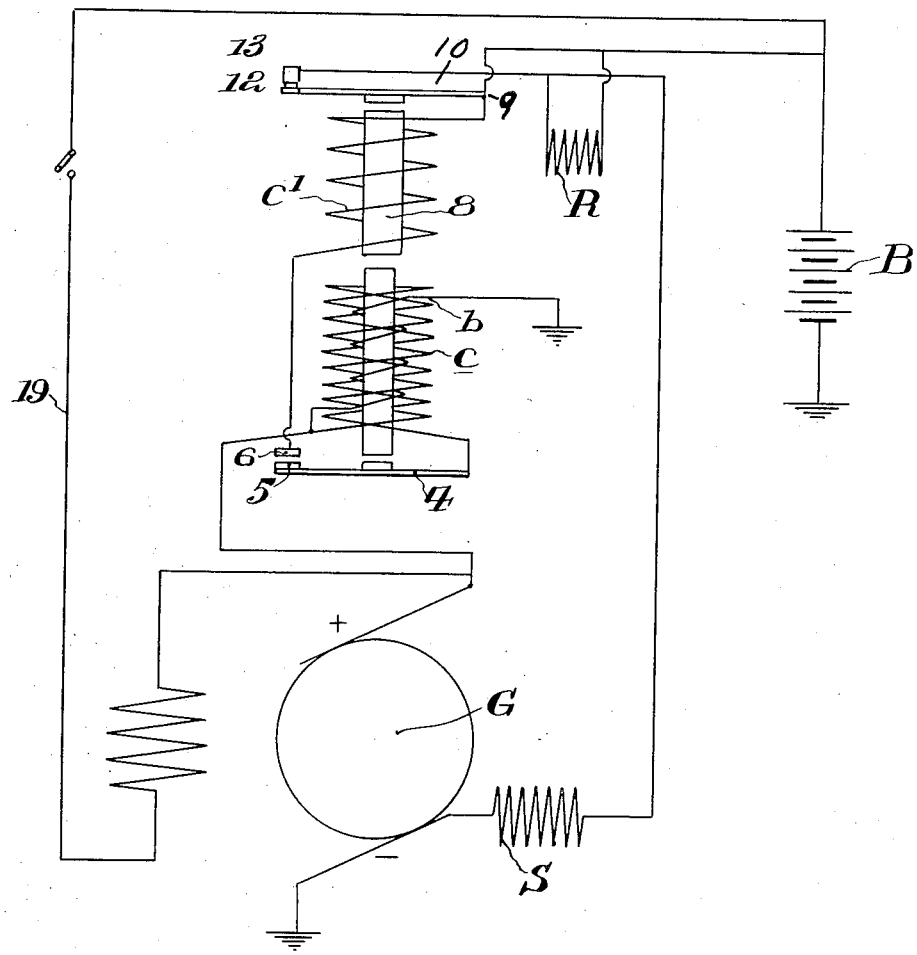
Fig. 4 is a diagrammatic view showing the manner of using the regulator.

The regulator consists generally in providing contacts which are normally separated and which are in the main circuit of the generator for charging the storage battery. These contacts are closed by a potential coil which is so regulated that the main circuit is closed only after the voltage of the generator has reached a proper charging value. A coil in the main circuit also controls these contacts so that if the speed of the generator decreases, said contacts will be positively opened by any discharge of the battery through the armature of the generator.

This regulator also includes a second pair of contacts which may be located in the shunt field of the generator and a coil in the main circuit operates to separate said contacts and open the field circuit when the current reaches a certain determinate value. As soon as the current drops or decreases by the opening of the field of the generator, these contacts close, and, therefore, said contacts, in effect, are continuously vibrated during the charging of the battery, and operate to maintain the current at a predetermined maximum value, regardless of the speed of the generator.

Referring more in detail to the drawings, the regulator consists of a central disk 1 of insulating material, which carries a core 2, on which is mounted a disk of insulating material 3. An armature 4 is rigidly attached to the disk 3. Said armature is of resilient material and is drawn toward the core 2 by the magnetic flux in said core. The armature 4 carries a contact 5. A second contact 6 is mounted in the disk 3, and these contacts 5 and 6 are normally separated. The terminal 7 of the coil is adapted to be connected to the positive brush of the generator G. See Fig. 4. The coil $c$ is wound about the core 10 and one end $7^a$ of the coil is connected with the terminal 7, while the other end 7ᵇ of the coil is connected with the armature 4 and the contact 5.

A potential coil $p$ is also wound around the core 10 and one end of this potential coil is connected to the line leading to the positive brush of the generator, while the other terminal of the potential coil is grounded. This regulator is particularly designed for use in connection with a current generator wherein the negative brush is grounded.

It will be understood, however, that the coil may be readily adapted for use in connection with a generator wherein the negative brush is not grounded, but connected with the return line from the battery.

The central disk 1 also carries a core 8. The contact 6 is connected with one end of the coil $c'$, which passes about the core 8 and the other end of this coil is connected with a terminal 9, which, in turn, is connected with an armature 10. A disk of insulating material 11 is supported at the upper end of the core 8, and the armature 10 is rigidly carried by this disk. Said armature is of resilient material and is retracted when the core 8 is electrically energized sufficiently to overcome the resiliency of the armature. Said armature carries a contact 12, which is adapted to engage a second contact 13 formed on the end of an adjustable screw 14 carried by a bridge 15, which, in turn, is supported by screws 16 tapped into the insulating disk 11. The bridge 15 is connected by a line 17 to the terminal 18 at the lower end of the coil, and this terminal 18 is adapted to be connected with one end of the shunt field circuit S for the generator, the other terminal of the shunt field circuit being joined to the negative brush of the generator.

The terminal 9 at the upper end of the regulator is also adapted to be connected directly with the positive pole of the battery B. The other terminal of the battery is grounded. The contacts 12 and 13 are normally closed. A resistance coil R is connected across the contacts 12 and 13. One end of the resistance coil is connected with the armature 10, while the other is connected with the bridge 15. This resistance coil serves to reduce the spark upon the opening and closing of the contracts 12 and 13.

The regulator is also provided with an outer cylindrical metal core 20. This metal core 20 extends from the central disk 1 of insulating material to and through the insulating disk 3. The lower end of the cylindrical core 20 is partially closed by a disk 21, which carries a collar 22 extending through the insulating disk 3. A brass collar 23 surrounds the core 2, and separates the core 2 from the collar 22 on the outer cylindrical core 20. The upper end of the core 20 is closed by a metallic disk 24.

It will be seen from the above description that the path of magnetic flux is from the center core to the outer core, and the only air gap is between the outer end of the core 2 and the outer end of the core 22. By this construction of regulator, the magnetic flux for closing the contacts 5 and 6 will be very strong, although the difference in potential between the brushes of the generator is comparatively low. This permits the spring supporting the contact 5 to be comparatively rigid. This regulator as above noted, is particularly adapted for use on motor-cycles wherein the jar during the running of the machine on the regulator is considerable. By my improved construction, which includes the inner and outer cores, I have provided an efficient means for closing the contacts, and at the same time the regulator may be so constructed as to be unaffected by the bodily vibrations imparted thereto during the normal running of the machine.

The potential coil $p$ is connected to ground through contacts 25, carried by the central insulating disk. These contacts 25 engage the surrounding casing 26 for the regulator. The casing 26 is connected to the frame of the machine and is grounded through the same. The casing 26 is provided with lugs 27, 27, by which the casing is attached to the frame of the motor-cycle. The regulating device is located within this casing and said casing is closed by a cover 28 having an opening 29 there-through. The lower cylindrical part 30 of the casing may be removed to give access to the contacts at the lower end of the regulator. As a preferred means for attaching the cores 2 and 8 to the central and insulating disk 1, I have shown in Fig. 8 a brass disk 31 embedded in the insulating disk 1, and having projecting parts 32 and 33 which engage the cores 2 and 8 respectively.

The operation of my regulator will be made apparent from Fig. 4 of the drawings, which shows said regulator diagrammatically connected with the generator and a battery. In this figure the battery is indicated at B and the positive brush of the battery is connected in circuit with the coil $c$, thence through the armature 4 and contacts 5 and 6, with the coil $c'$, and thence through the terminal 9 direct to the positive pole of the battery B. The potential coil $p$ connects with the positive brush of the generator and with the ground so that said potential coil is across the brushes of the generator. The contact 13 is connected with the shunt field of the generator.

I have shown in the drawings also a separate starting circuit 19 for the generator which is connected to a series field on the generator. The starting circuit is especially adapted to be used in connection with the motor of the generator when the same is used as a motor for starting the prime mover. A switch is located in this starting circuit for the purpose of controlling the same.

My improved regulator is especially adapted to be used in connection with a charging system for a storage battery for a motorcycle. The speed of the motor varies between wide ranges, and the purpose of the regulator is to provide a perfect control for the charging current, and to prevent discharge of the battery through the armature of the generator for all speeds of the motorcycle. The generator G is connected to the hydro-carbon engine of the motorcycle by any suitable connection and when so driven, charges the storage battery over the main circuit connected therewith.

When the battery is being charged the shunt field S is used, whereas, when the engine is being started, the generator being used as a motor, the series field alone is used. When the generator is at rest, the contacts 5 and 6 are open, as the resiliency of the armature 4 normally holds these contacts separated. As soon as the generator is started, the voltage thereof rises to such a value that the potential coil $p$ draws the armature 4 so as to close the contacts 5 and 6, and this closes the main circuit between the generator and the battery B. The potential at which the coil $p$ acts is above that of the battery sufficiently to prevent reverse current from the battery through the generator, and, therefore, by the closing of the contacts 5 and 6 the charging current flows to the battery.

Let us suppose that the speed of the motorcycle becomes very excessive or high; the coil $c'$ is a current coil and will operate to separate the contacts 12 and 13 as soon as the current reaches a certain predetermined value. This separating of the contacts 12 and 13 opens the field circuit of the generator and, as a consequence, the current value will at once drop. As the current value drops, the resiliency of the armature carrying the contact 12 will cause said contacts 12 and 13 to again close, which establishes the shunt field circuit, and the current value again rises. The movable contact 12 in actual practice is vibrated continuously during the charging of the battery, and the length of time which said contacts are separated is varied according to the speed of the armature, so that the field strength of the generator is varied and thereby the current value maintained approximately uniform.

If the generator decreases in speed or is brought to rest the contacts 5 and 6 will be separated, as the action of the coil $c$ with the reverse current from the battery to the armature of the generator neutralizes the action of the potential coil $p$ on the armature, and this permits said armature to move to separate the contacts. When the generator is brought to rest, the coil $c$ assures that the contacts 5 and 6 will be open, and, therefore, the main charging circuit is broken. This enables the starting circuit 19 to be utilized for operating the generator as a motor to turn over the engine.

While I have described my improved regulator as especially adapted for controlling the charge of a battery where the speed of the generator varies through wide ranges, it will be obvious from certain aspects of the invention that said regulator may be otherwise used, where it is desired to control the current value of the generator for any purpose.

Having thus described my invention, what I claim is:

1. An automatic switch including in combination a central disk of insulating material, a core attached to said disk, a coil surrounding said core, a disk of insulating material carried by the lower end of said core, a second cylindrical core surrounding the coils and having metallic connection with the first named core at one end, the other end of said cylindrical core having a projecting collar substantially flush with the end of the core, contacts carried by said last named insulating disk, a movable armature supporting one of said contacts, and adapted to be influenced by the magnetic flux passing between the end of the central core and the end of the collar on the cylindrical core.

2. An automatic switch including in combination a central disk of insulating material, a core attached to said disk, a coil surrounding said core, a disk of insulating material carried by the lower end of said core, a second cylindrical core surrounding the coils and having metallic connection with the first named core at one end, the other end of said cylindrical core having a projecting collar substantially flush with the end of the core, contacts carried by said last named insulating disk, a movable armature supporting one of said contacts, and adapted to be influenced by the magnetic flux passing between the end of the central core and the end of the collar on the cylindrical core, a coil surrounding said last named core, an armature controlled by said last named core, a movable contact carried by said armature, and a fixed contact coöperating with said movable contact and a casing inclosing all the above named parts.

In testimony whereof, I affix my signature, in the presence of two witnesses.

EDWARD B. JACOBSON.

Witnesses:
 CHARLES L. STURTEVANT,
 JOHN D. STEPHENS.